United States Patent [19]
James

[11] 3,869,536
[45] Mar. 4, 1975

[54] DISPLACEMENT CHROMATOGRAPHIC METHOD FOR SEPARATING URANIUM ISOTOPES

[75] Inventor: Dean B. James, Franklin Township, Pa.

[73] Assignee: Atlantic Richfield Company, New York, N.Y.

[22] Filed: Nov. 12, 1970

[21] Appl. No.: 88,904

[52] U.S. Cl. .................................. 423/7, 423/260
[51] Int. Cl. ........................................... C01g 43/02
[58] Field of Search .......... 23/337, 338, 351; 423/7

[56] References Cited
UNITED STATES PATENTS
3,511,620    5/1970    Shimokawa et al. .............. 23/337 X FOREIGN PATENTS OR APPLICATIONS
1,600,437    9/1970    France ................................. 423/7
696,549      2/1971    South Africa .......................... 423/7
778,061      7/1957    Great Britain ...................... 23/338
1,115,797    5/1968    Great Britain ...................... 23/338

Primary Examiner—Leland A. Sebastian
Attorney, Agent, or Firm—John R. Ewbank

[57] ABSTRACT

A salient part of the disclosure describes a method for separating $U^{235}$ isotope from $U^{238}$ isotope comprising introducing a solution containing a reducing cation such as $Ti^{+3}$ into a cation-exchange resin column, thereafter introducing a uranyl solution containing both $U^{235}$ and $U^{238}$ isotopes, followed by introduction of a solution containing an oxidizing agent such as $Fe^{+3}$ and thereafter separately recovering uranyl solutions containing uranium which is enriched in $U^{235}$ isotope and uranium which is correspondingly depleted in $U^{235}$ isotope.

6 Claims, 2 Drawing Figures

(PRIOR ART)

DEAN B. JAMES - INVENTOR

DISPLACEMENT CHROMATOGRAPHIC METHOD FOR SEPARATING URANIUM ISOTOPES

BACKGROUND OF THE INVENTION

1. Field of the Invention

This invention relates to separation of uranium isotopes, and particularly to the separation of $U^{235}$ from $U^{238}$.

2. Description of the Prior Art

Previous processes of separating $U^{235}$ from natural uranium were very costly and complicated, requiring extensive piping, separating, and pumping equipment.

Referring to prior art, FIG. 1 relates to an ion-exchange method for separating uranium isotopes wherein a cation-exchange resin 4 carrying U(IV) is contacted at 5 with an acid solution 8 of U(VI). At equilibrium the uranium in solution 9 becomes enriched in $U^{235}$ isotope by a factor of 1.0007 (usually referred to as the "separation factor," which is the ratio of the ratios of $U^{235}$ to $U^{238}$ in the feed solution to that in the exit solution (while the uranium on the resin 6 is correspondingly depleted. It is known that one may achieve greater enrichments than this using a process wherein the resin and solution (FIG. 1) flow countercurrently in continuous streams, the slightly enriched U(VI) being reduced in a separate chemical reactor to U(IV), then sorbed onto additional cation-exchange resin, and thereafter equilibrated with U(VI) solution to achieve another enrichment of the U(VI) by a separation factor of 1.0007. This process requires so many units and involves so many pumps, valves, piping, and columns to achieve significant enrichment that it is not practical economically. One of the basic disadvantages is that the uranium ions must be oxidized and reduced in equipment external to the ion-exchange columns; further, after each slight enrichment the U(VI) must be withdrawn from the column and reduced to U(IV) in separate equipment and then reintroduced to an ion-exhange bed. An example of the foregoing process is taught in U.S. Pat. No. 3,511,620 to Shimokawa, et al., May 12, 1970.

SUMMARY OF THE INVENTION

An object of the invention is to provide a novel process for isotopic enrichment of uranium. Another object is to provide this in a simpler, more economical manner. Yet another object is to provide such in a system which does not require multi-unit counter-current contacting. Still another object is to provide this with a technique which is capable of achieving any desired degree of isotope separation.

Another object is to provide a method for effecting simple, low-cost enrichment in $U^{235}$ isotope concentration to useful levels with a variety of starting uranium feeds, including feeds with such a low level of $U^{235}$ isotope concentration that they were heretofore thought useless.

A further object is to achieve significant enrichment of $U^{235}$ in an economical process involving an ion-exhange separation technique that avoids the need for reducing and oxidizing the uranium outside of the ion-exchange columns.

These and other objects, as will become more apparent, are achieved in a preferred embodiment by first, feeding a solution containing reducing cations capable of reducing hexavalent uranium to tetravalent uranium to a column containing cation-exchange resin; second, feeding a solution containing hexavalent uranium to said column; third, feeding a solution containing oxidizing agent and recovering a solution containing hexavalent uranium enriched in $U^{235}$ isotope; and recovering a solution containing hexavalent uranium of the same isotopic composition as the feed; and recovering a solution containing hexavalent uranium depleted in $U^{235}$ isotope; provided, the feeding of said solution containing oxidizing agent is initiated before the reducing cations are completely replaced on said column by uranium.

More particularly, one may convert all the resin in each column to the reducing-cation form such as the trivalent-titanium form, then feeding a solution of hexavalent uranium to the column, and thereafter feeding a solution of an oxidizing agent such as trivalent iron; and finally recovering as products: hexavalent uranium enriched in $U^{235}$ isotope, hexavalent uranium neither enriched nor depleted (the same isotopic composition as was originally fed to the column system), and hexavalent uranium depleted in $U^{235}$ isotopes. Any degree of enrichment can be achieved with this novel process, depending only upon the length of the ion-exchange column system (this, in turn, being a multiple of the original uranium-loaded column length).

DETAILED DESCRIPTION OF THE INVENTION AND THE PREFERRED EMBODIMENTS

Figure 1:
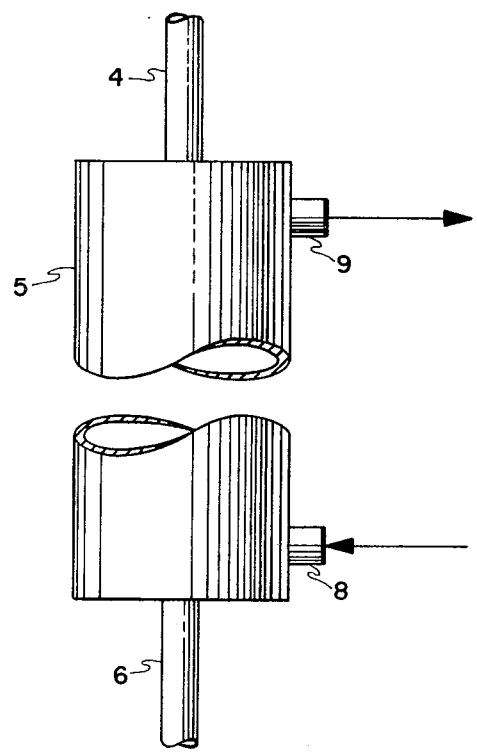
FIG. 1 is a schematic showing of a reference prior art process for ion-exhangee enrichment of uranium.
Figure 2:
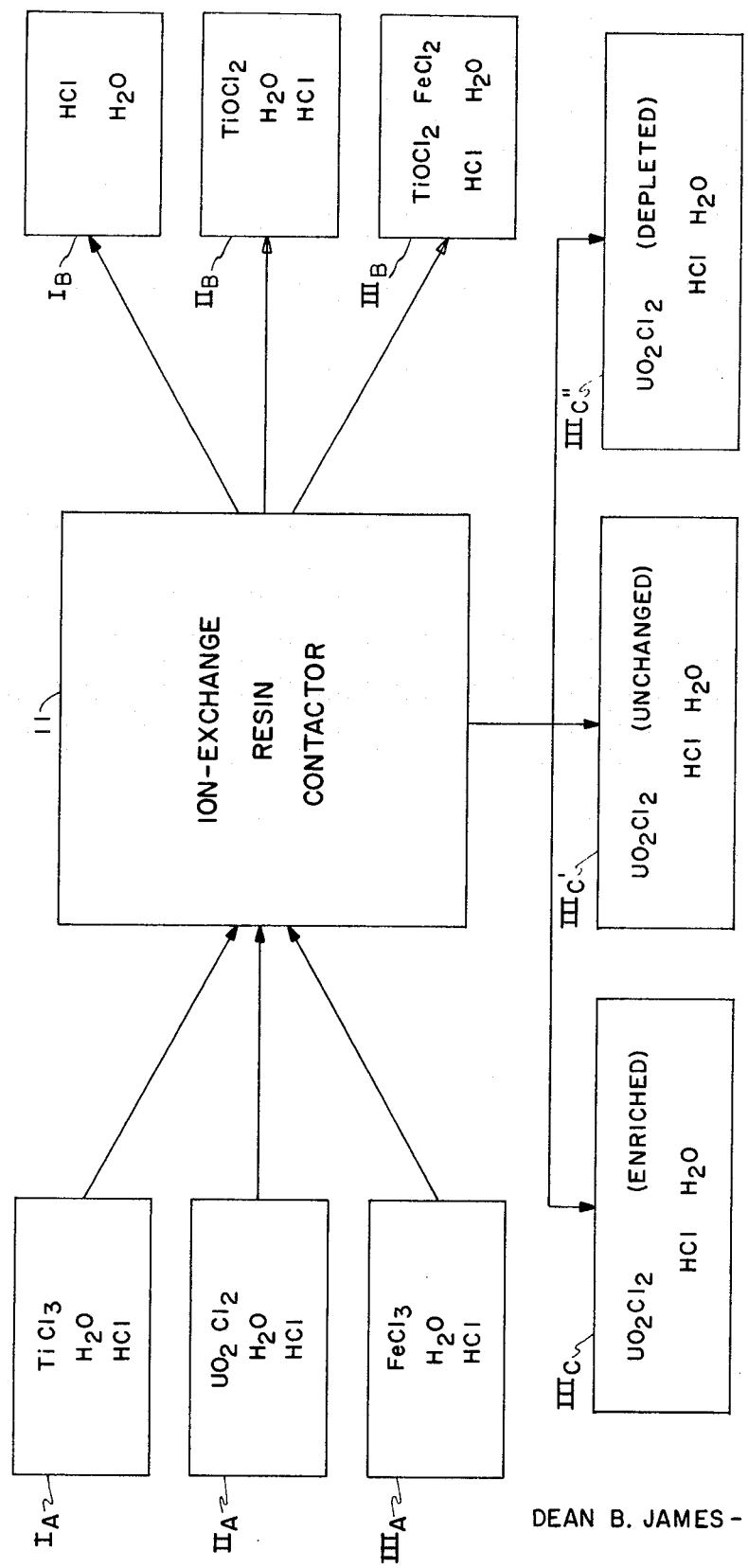
FIG. 2 is a flowsheet summarizing the salient process steps according to one embodiment of the invention.

The process embodiments described according to this invention are conducted with equipment including a cation-exchange contactor system 11 (e.g., series of columns) referring to FIG. 2. The contactor columns are packed with a granular cation-exchange material. Such materials are well known and commercially available. Suitable cation exchange materials include synthetic organic resins (strong-acid, intermediate-acid, and weak-acid resins) and the inorganic cation-exchange materials, both natural and synthetic. Preferred are strong acid cation-exchange resins. In any event, the resin must function as cation exchangers in the prescribed chemical environment, being operative for instance at the operating acidity level (cf. pH ranges below). Equivalent cation-exchange materials will be evident, such as related resin material, combinations of an inert substrate with a coating of ion-exchange liquid or suitable natural or synthetic inorganic materials, such as Zeolites. One suitable resin comprises a sulfonated copolymer of styrene and 8 percent divinylbenzene.

Preferably, the cation-exchange material is introduced in the hydrogen or sodium form and rinsed once with dilute hydrochloric acid before the process is begun. The diameter of the columns can be between at least about ten resinbead diameters and no more than the maximum diameter through which solution can be flowed in a uniform manner. For maximum throughput, column diameter should be as great as is consistent with crosssectionally-uniform flow. The overall length of the cation-exchange column contactor system (effective length) will control the degree of enrichment to be achieved. Instead of a single long column, it is generally preferable to employ a linked series of shorter column segments, with the fluid exiting from the first column being passed directly to the second, and so on through the final column segment. This linked-column arrangement is more convenient in that a single column segment may readily be bypassed when regeneration or replacement of the ion-exchange resin is necessary without interrupting the continuity of the process. The various solutions to be described in detail later are introduced at the beginning of the column system (i.e., at top of first column, being vertical for uniform gravity flow) and after passing serially through each column segment is recovered at the bottom of the final segment. When a series of shorter columns is used, care should be taken to minimize the length and diameter of the connecting tubes or pipes to avoid back-mixing of the solutions as they pass between column segments.

A solution containing the reducing cation is prepared by any conventional method. Where the selected reducing cation is trivalent titanium, it will be convenient to prepare a slightly acid aqueous solution of trivalent titanium ions $I_A$ by electrolytically reducing an acid solution of titanium tetrachloride or by dissolving titanium metal with acid. The solution containing the reducing cation is slowly passed through the column system until all of the cation-exchange material (resin) is converted to the reducing-cation form. This point is reached when the reducing cation appears in the exiting solution.

An alternate to using a reducing cation sorbed in a cation-exchange material could in some instances comprise using of a mixture of a cation-exchange material and a granular redox material (resin), which has sufficient strength to effect the reduction of uranyl ions to uranous ions. Redox resins generally are capable of effecting the reduction or oxidation of ions in solutions that are percolated over them. A mixed granular bed of redox and cation-exchange material is necessary to the process (here) in order to accomplish both the reduction of uranyl ions to uranous ions and the sorption of the uranous ions in an immobile phase. A second option is to prepare a single bifunctional granular material which would exhibit both redox and cation-exchange properties. Such a granular material could be used in this process to replace the reducing cation and the cation-exchange material.

A slightly acidic aqueous solution $II_A$, containing hexavalent uranium, is prepared in a conventional manner such as by dissolving the metal form, the metal-oxide form, or any other suitable uranium compound in strong acid, preferably a mixture of concentrated hydrochloric acid which is thereafter diluted with water to the desired concentration. The starting uranium may be of any isotopic composition (e.g., $U^{235}$ content) before it is passed to the column system. It should be borne in mind that the anion component of any starting uranyl solution should be compatible with the prescribed chemical system; for example, it should not form soluble complexes with uranyl or uranous ions or tend to form other phases. One very suitable source is natural uranium metal which has a $U^{235}$ isotopic fraction of about 0.715 weight percent. Even uranium with a very low $U^{235}$ content may be employed; for example, tailings from other enrichment processes such as the gaseous diffusion enrichment process. Since these tailings are so much cheaper, it is sometimes more economical to use them than natural uranium.

This slightly acidic solution containing hexavalent uranium $II_A$ is passed to the column loaded with the reducing cation, forming a boundary between the reducing cation region of the resin and olive-green $UOH^{+3}$ —$UO_2^{+2}$ mixture in the resin; the boundary moves along the column as more U(IV) solution is added. Simultaneously, the reducing cation, which has been oxidized, is recovered in an aqueous solution $II_B$ at the end of the column series; however, before all of the reducing cation is removed, the feeding of the solution $II_A$ of uranium ion is stopped and feeding of oxidizing agent solution $III_A$ is begun.

As the hexavalent uranium comes in contact with the reducing cation in the resin, the uranium ions become reduced to their tetravalent state and become associated or "fixed" on the resin, replacing the reducing cations which are oxidized ($TiO^{+2}$) and pass off the resin column in the moving solution. As more U(VI) is added, it passes over the fixed $UOH^{+3}$ —$UO_2^{+2}$ region until it contacts the fixed reducing cation ($Ti^{+3}$) giving the appearance of a region of uranium growing in length as the boundary between uranium and reducing cation moves down the column.

The oxidizing agent solution is prepared in conventional manner. When $Fe^{+3}$ is the ozidizing agent, a solution is conveniently prepared by dissolving iron metal, ferric chloride, or any suitable iron compound in hydrochloric acid and thereafter diluting to the desired molar concentration and acidity with water. The slightly acidic ferric chloride solution $III_A$ is thereafter introduced at the beginning of the column system. As the trivalent iron in the solution contacts fixed $UOH^{+3}$ —$UO_2^{+2}$, the uranium ions are replaced by oxidizing agent ions and the $UOH^{+3}$ ions are oxidized to $UO_2^{+2}$ ions forming a uranyl chloride solution which moves along over the remaining uranium-loaded resin. When this uranyl chloride solution reaches the uranium-reducing cation boundary, partial reduction of the uranium and total exchange with the fixed reducing cations occurs as described previously. A solution $III_B$ containing oxidized reducing cation and reduced oxidizing agent exits from the column. Other suitable oxidizing agents are feasible; of course, they must have sufficient oxidizing strength to effect the oxidation of uranous ions to uranyl ions and must be compatible with the chemistry of the system (as recited above for alternate anions associated with uranyl ions).

As more ferric chloride solution or alternative oxidizing agent is passed onto the column system, more uranium is displaced and the boundary between $Fe^{+3}$ or other oxidizing agent ions and uranium-form resin moves along the resin column system. Simultaneously the uranium-reducing cation boundary moves along also. Thereby, the region of uranium is slowly (much slower than the rate of flow of the solutions, because the resin phase is much more "concentrated" than the solution phase) moved along the resin column system.

As the uranium region is eluted through the length of the column, the $U^{235}$ isotope becomes more and more separated from the $U^{238}$ isotope. When the elution of the uranium region is carried through a sufficient length of resin bed to achieve a substantially complete separation of the isotopes, the isotopic regions are adjacent; when the elution distance is less than this, part of the recovered U(VI) is of the same isotopic ratio as the feed uranium.

After all of the uranium ions are collected, the oxidizing agent can be removed from the column system to prepare for another elution batch by conventional techniques such as by passing a strong HCl solution (preferably greater than 4 molar) through the system. This will return the resin to the hydrogen-ion form.

The following examples are intended to be illustrative but not limiting.

EXAMPLE I

A solution of trivalent titanium was prepared by dissolving 19.69 grams of titanium metal in concentrated hydrochloric acid and the diluting with 500 ml of deionized water. A solution of uranyl chloride was prepared by dissolving 9.465 grams of uranium dioxide containing 48.5 weight percent $U^{235}$ isotope in a mixture of nitric and hydrochloric acids, and boiling to near-dryness with additions of concentrated hydrochloric acid in between to form a uranyl chloride solution. Then the uranyl chloride solution was boiled to near-dryness three times with intermediate additions of deionized water. The resulting solution was diluted to 531 ml with deionized water and hydrochloric acid and water added to bring the solution to 638 ml at 0.1 M HCl and 0.65 M U.

A $Fe^{+3}$ solution was prepared by dissolving 20.27 grams of ferric chloride hexahydrate and 8.33 ml of 12 molar hydrochloric acid in enough deionized water to bring volume to one liter, resulting in a solution which was 0.075 molar in $Fe^{+3}$ ion and 0.05 molar in hydrogen ion.

Three standard glass chromatography columns with porous-glass frits and having a 1.0-cm internal diameter were filled with 28 cm of "Dowex 50WX8" (100–200 mesh U.S. Sieve Service) resin in the hydrogen form (a sulfonated copolymer of styrene and 8 percent divinylbenzene), and the resin was rinsed with 0.1 M HCl.

The $TiCl_3$ solution was passed over each of the columns until the purple of the $Ti^{+3}$ ion appeared at the bottom. Each loaded column was rinsed with 0.1 M HCl.

The $UO_2Cl_2$ solution was passed at about 1.5 ml per minute over one of the columns until the boundary between the purple of the $Ti^{+3}$ and the green of the uranium ions had passed down the column about 9.5 inches.

With the other two columns (connected in series downstream from the column containing the uranium), elution with the ferric chloride solution was begun; it was observed that the front boundary of the uranium region moved slightly faster than the rear boundary until the uranium region reached a length of 14.0 inches. The boundaries between the regions remained sharp, the uranium region at a constant length, and all the regions homogeneous in appearance.

The flow rate of the ferric chloride solution was adjusted to about three drops per minute and, except while columns were disconnected and regenerated, was continued until the uranium region had passed through ten column segments (about 11 inches of resin per column segment).

As the front boundary of the uranium region passed off, the bottom of the tenth column segment, several samples of the exiting solution were taken and analyzed mass spectrographically to determine the $U^{235}/U^{238}$ isotopic ratio. The 235/238 ratio in one sample of uranium taken at the front of the uranium region was determined mass spectrographically to be 0.972. A sample of the feed was analyzed mass spectrographically to have a 235/238 ratio of 0.947; the ratio of these ratios yields an enrichment factor of 1.026.

The foregoing procedures were carried out under normal ambient laboratory conditions (e.g., room temperature).

EXAMPLE II

Example 1 was repeated (identical apparatus, conditions, etc.) except that the uranium feed isotopic composition was 0.714 weight percent $U^{235}$ and a 235/238 ratio of 0.00720. The loaded uranium region was 4.3 inches long and grew to 6.7 inches. The isotopic ratios of the first three samples collected from the front of the uranium region were 0.00892, 0.00745 and 0.00959. This represented a $U^{235}$ weight percent of 0.884, 0.740, and 0.950, respectively. Compared to the feed composition, these samples showed isotopic enrichment factors of 1.240, 1.035, and 1.332, respectively.

Three more samples from the rear of the uranium region were analyzed from this run. The isotopic ratios were 0.00840, 0.01392, and 0.01219, respectively, with $U^{235}$ weight percentages of 0.833, 1.371, and 1.204, respectively, yielding isotopic enrichment factors of 1.167, 1.935, and 1.695, respectively.

EXAMPLE III

Example I was again repeated except that the uranium feed isotopic composition was 0.224 weight percent $U^{235}$ with a 235/238 ratio of 0.00224. The loaded uranium region was 4.2 inches long and grew to 6.2 inches. The isotopic ratios of the first three samples collected at the front boundary were 0.00613, 0.00450, and 0.00334, representing $U^{235}$ weight percentages of 0.610, 0.448, and 0.333, respectively. Compared to the feed composition, these samples showed isotopic enrichment factors of 2.737, 2.007, and 1.490, respectively.

Three more samples from the rear of the uranium region were analyzed from this run. The isotopic ratios were 0.00969, 0.00634, and 0.00647, representing $U^{235}$ weight percentages of 0.959, 0.630, and 0.643, respectively, and yielding isotopic enrichment factors of 4.322, 2.828, and 2.887, respectively.

These examples demonstrate that the method of the invention may be used to enrich the $U^{235}$ isotopic concentration of feeds containing virtually any starting $U^{235}$ isotopic concentration.

Having described and illustrated the invention in great detail, it should be apparent to those skilled in the art that variations, modifications, and improvements may be made without departing from the spirit and scope of the invention.

What is claimed is:

1. A method for separating $U^{235}$ isotope from $U^{238}$ isotope comprising
   first, feeding a solution containing trivalent titanium to a column system containing cation-exchange resin;
   second, feeding a solution containing hexavalent uranium and recovering a solution containing tetravalent titanium;

third, feeding a solution containing trivalent iron and recovering a solution containing hexavalent uranium enriched in $U^{235}$ isotope;

fourth, recovering a solution containing hexavalent uranium of the same isotopic composition as the feed, and provided, however, that the feeding of said solution containing trivalent iron is initiated before the trivalent titanium, sorbed on the resin, is completely replaced by uranium.

2. In the method of separating $^{235}U$ isotope from $^{238}U$ isotope by opportunity for exchange between uranium on solid ion exchange sites and uranium in an adjacent aqueous solution during oxidation-reduction equilibria involving tetravalent and hexavalent uranium, and wherein the various ion exchange sites and solutions involve at least five species of cations consisting of a reductant metal cation, the oxidized form of the reductant metal cation, tetravalent uranium cation, hexavalent uranium cation, an oxidant metal cation, the reduced form of the oxidant metal cation, and a cheap cation for elutriating the oxidant metal from the cation exchange sites, the improvement which consists of:

providing a fixed bed comprising solid particles of ion exhange material, the liquid treatment solutions being fed at an initial portion and the solutions being withdrawn at a terminal portion, said bed having a great length relative to its average cross sectional dimension, and feeding a solution containing the cheap cation to elutriate other cations so that throughout the entire length of said bed, the cation exchange sites are occupied predominantly by such cheap cations and to provide a cheap cation region extending the entire length of the bed;

treating said bed with a batch of a solution of a reducing metal cation to provide a reducing metal region extending the entire length of the bed, the cation sites after such treatment being occupied predominantly by the reducing metal cations said reducing metal cations being capable of reducing dissolved hexavalent uranium to sorbed tetravalent uranium;

treating said bed having the reducing metal region throughout its full length with a controlled batch of a solution of hexavalent uranium susceptible of enrichment to provide at the initial portion of the bed a uranium zone, the remaining reducing metal region having a length which is several times the length of the uranium region, and the total bed length being several times the length of the uranium region to provide a bed length/uranium region length ratio which is significantly greater than one, and withdrawing a solution containing the oxidized form of the reducing metal;

treating said bed with a first controlled-size batch of a solution of an oxidizing metal cation to form an oxidizing metal region which grows from the initial portion and has a front boundary at the rear boundary of the uranium region, whereby the reducing metal region is shortened to extinction as the oxidized form of the reducing metal ion is elutriated from the bed, and as the uranium region moves along the bed by chromatographic displacement from the initial position with its rear boundary at the initial portion of the bed to its elutriation position with its front boundary at the terminal portion of the bed, such displacement occurring without significantly modifying the bed length/uranium region length ratio;

treating said bed with a second controlled-size batch of a solution of an oxidizing metal cation for elutriating uranium from the bed during an initial elutriation period to recover a solution of hexavalent uranium containing an enriched concentration of $^{235}U$;

treating said bed with a third controlled-size batch of a solution of an oxidizing metal cation for elutriating uranium from the bed during the principal elutriation period to recover a batch of solution of hexavalent uranium containing an isotope distribution resembling that of the feed, whereby the rear boundary of the uranium region is moved to adjacent the terminal portion of the bed, said principal batch of solution of recovered hexavalent uranium being many times larger than the recovered batch of enriched uranium;

treating said bed with a fourth controlled-size batch of a solution of an oxidizing metal cation for elutriating uranium from the bed during the final elutriation period to recover a solution of hexavalent uranium having an isotopic distribution different from that occurring during the middle of the uranium elutriation, whereby throughout the entire length of the bed, the cation exchange sites are predominantly occupied by oxidizing metal cations; and elutriating the oxidizing metal from the bed by repeating the treatment with a solution of a cheap cation so that throughout the entire length of the fixed bed the cation exchange sites are predominantly occupied by such cheap cations and to provide a cheap cation region suitable for repetition of the steps of the process.

3. A chromatographic displacement method for separating a fraction enriched in $^{235}U$ isotope from a feed material containing both $^{235}U$ and $^{238}U$ isotopes comprising at some time conducting each of the following steps:

loading a controlled size batch of tetravalent uranium feed material to establish a uranium region having a front boundary and a rear boundary on a prescribed initial segment of a fixed bed cation-exchange system having a prescribed overall length which is several times longer than the length of the uranium region, said system having an initial portion to which solutions are fed and a terminal portion from which effluent solutions are withdrawn;

loading the rest of said system length fully with a prescribed reducing cation to provide a reducing cation region in front of the uranium region and extending substantially to the terminal portion of the system, said prescribed reducing cation being a metal cation capable of reducing dissolved hexavalent uranium to sorbed tetravalent uranium;

percolating a first controlled size batch of a solution containing a prescribed oxidizing agent through the column length containing said combination of a reducing region in front of a uranium region, thereby moving the uranium region along the cation exchange system while shortening the reducing cation region until the front boundary of the uranium region is at the terminal portion of the cation exchange sytem, the reducing cation region having been shortened to extinction by the percolation of said first controlled size batch of solution of oxidizing agent; and recovering a solution containing hexavalent uranium enriched in $^{235}U$ isotope from the effluent during the percolation of a second controlled size batch of solution containing said prescribed oxidizing agent through the column length, containing said combination of an uranium region in front of an oxidizing region, the enrichment factor for the fractional concentration of $^{235}U$ isotope being greater than during the percolation of a third controlled size batch of solution containing said oxidizing agent for withdrawing an effluent containing the principle portion of the uranium, said third controlled size batch being significantly larger than said second controlled size batch of solution of oxidizing agent.

4. A chromotographic displacement method for separating a fraction enriched in $^{235}U$ isotope from a feed material containing both $^{235}U$ and $^{238}U$ isotopes comprising:

first, feeding a solution containing trivalent titanium to a column system containing cation-exchange material to provide a titanium region extending substantially the full length of the column, said column having an initial portion to which solutions are fed and a terminal portion from which effluent solutions are withdrawn;

second, feeding a controlled size batch of a solution containing hexavalent uranium to provide a uranium region near the initial portion of the column and recovering an effluent solution containing tetravalent titanium from the terminal portion of the column, the length of the resulting titanium region being several times the length of the resulting uranium region;

third, feeding a first controlled-size batch of solution containing trivalent iron to form an iron region behind the uranium region and to move the uranium region along the length of the column while shortening the titanium region until the boundary between the uranium region and the titanium region is at the terminal portion of the column and thereafter feeding a second controlled-size batch of solution containing trivalent iron during an initial portion of the uranium elutriation for recovering a relatively small batch of solution containing hexavalent uranium enriched in $^{235}U$ isotope;

fourth, feeding a third controlled-size batch of solution containing trivalent iron for recovering a solution containing hexavalent uranium during the elutriation of the principal portion of the uranium region, such third batch being much larger than the second batch of solution containing trivalent iron; and provided, however, that the feeding of said first controlled batch of solution containing trivalent iron is initiated before the trivalent titanium, sorbed on the resin, is completely replaced by uranium by reason of control of the size of the batch of the solution of uranium to load uranium onto a shorter length of the column than the length of column loaded with titanium.

5. In a method of preparing compositions having isotopic distributions of $^{235}U$ isotope and $^{238}U$ isotope different from the isotopic distributions of uranium feedstock compositions by providing for exchange between tetravalent uranium sorbed on ion exchange sites in a uranium region of a bed of ion exchange solids and a flowing adjacent aqueous solution of hexavalent uranium, said methos including a step of treating the uranium region of the bed with an aqueous solution of a salt of an oxidizing metal cation, whereby the sorbed tetravalent uranium is oxidized to form a solution comprising both the lower valent form of the oxidizing metal cation and hexavalent uranium, such treatment forming an oxidizing metal sorbed to provide an oxidizing metal region in which the ion exchange sites are occupied predominantly by sorbed oxidizing metal cations, said region having a front boundary at the rear boundary of the advancing uranium region, the improvement of reductive chromatographic displacement which consists of:

providing a porous bed of ion exchange solid material, which bed remains in a predominantly fixed position relative to solution flow, the liquid treatment solutions being supplied at at least one feed zone and the solutions being withdrawn at at least one effluent zone, there being a large ratio of the length of the bed to the cross section dimension of the bed, thereby promoting substantially plug flow of aqueous solutions, the cross sectional characteristics of such flow not being adversely affected as the solutions advance along the length of the bed, there being at least sometimes a plurality of displaceable regions along the length of the bed, some of the chemical reactions occurring at the boundaries between adjacent regions of the bed, the front boundary of an advancing region being distinguished from the rear boundary and from the principal portion of an advancing region:

feeding a solution of a metal cation to provide a region of the bed in which the ion exchange sites are occupied predominantly by sorbed reducing metal cations capable of reducing dissolved hexavalent uranium to sorbed tetravalent uranium, such reducing metal region extending ahead of the uranium region so that the rear boundary of the reducing metal region is at the front boundary of the uranium region, said feeding being stoichiometrically equivalent to the hereinafter designated feeding of the oxidizing metal cation and being many times the stoichiometric equivalent of the tetravalent uranium sorbed on the ion exchange sites in the uranium region;

feeding a solution of an oxidizing metal cation to provide an oxidizing metal region having a front boundary at the rear boundary of the uranium region, such feeding being a driving force for advancing the combination of the front boundary of the oxidizing metal region, the uranium region, and the rear boundary of the reducing metal region along the length of the bed by reductive chromatographic displacement, such displacement predominantly occuring without significantly modifying the ratio of bed length to uranium region length, the rate of feeding of the oxidizing metal solution being controlled to promote said plug flow of aqueous solutions through the bed and the feeding of the oxidizing metal being continued for many hours, the feeding of the oxidizing metal ion being many times the stoichiometric equivalent of the tetravalent uranium sorbed in the uranium region, said feeding of the oxidizing metal cation being substantially stoichiometrically equal to the feeding of the reducing metal cation;

withdrawing from the bed an aqueous solution containing a quantity of an oxidized form of the reducing metal cation corresponding to the amount of reducing metal cation fed to the bed;

withdrawing from the bed an aqueous solution containing a quantity of a reduced form of the oxidizing metal cation, such reduced form being a lower valent form of the oxidizing metal cation corresponding to the amount of oxidizing metal cation fed to the bed;

feeding a solution of hexavalent uranium compound susceptible of enrichment to provide a uranium region having a front boundary at the rear boundary of the reducing metal region, said uranium region having a rear boundary at the front boundary of the oxidizing metal region, the combination of the rear boundary of the reducing metal region, the uranium region, and the front boundary of the oxidizing metal region being adapted to advance by reductive chromatographic displacement along the length of the bed, the thus fed hexavalent uranium solution being subjected to reduction to tetravalent uranium absorbed on the ion exchange sites, such uranium reduction occurring at the boundary between the front of the uranium region and the rear of the reducing metal region, and the tetravalent uranium absorbed on the ion exchange sites being subjected to oxidation to hexavalent uranium cation in solution, such uranium oxidation occurring at the boundary between the rear of the uranium region and the front of the oxidizing metal region, such aqueous solution of hexavalent uranium generated within the ion exchange bed flowing from the rear boundary through the body to the front of the uranium region, and after the uranium region has advanced a length many times the cross sectional dimension of the bed;

withdrawing from the front and rear boundaries of the uranium region solutions of uranium compounds having an isotopic distribution different from that in the uranium solution fed to the bed.

6. The method of claim 5 in which the reducing metal ion region ahead of the uranium region is a region in which most of the cation sites are occupied by trivalent titanium cations attributable to the feeding of a titanous salt solution.

* * * * *